United States Patent [19]
Abdallah et al.

[11] Patent Number: 6,085,312
[45] Date of Patent: Jul. 4, 2000

[54] METHOD AND APPARATUS FOR HANDLING IMPRECISE EXCEPTIONS

[75] Inventors: Mohammad Abdallah; Vladimir Pentkovski, both of Folsom, Calif.

[73] Assignee: Intel Corporation, Santa Clara, Calif.

[21] Appl. No.: 09/052,994

[22] Filed: Mar. 31, 1998

[51] Int. Cl.[7] .................................................. G06F 9/40
[52] U.S. Cl. ......................................................... 712/208
[58] Field of Search .............................. 712/208, 32, 20, 712/204; 710/260

[56] References Cited

U.S. PATENT DOCUMENTS

| | | | |
|---|---|---|---|
| 4,038,533 | 7/1977 | Dummermuth et al. | 700/7 |
| 4,099,229 | 7/1978 | Kancler | 712/204 |
| 4,727,477 | 2/1988 | Gavril | 710/64 |
| 5,452,426 | 9/1995 | Papworth et al. | 395/375 |
| 5,471,633 | 11/1995 | Colwell et al. | 395/800 |
| 5,499,352 | 3/1996 | Clift et al. | 395/412 |
| 5,537,559 | 7/1996 | Kane et al. | 712/244 |
| 5,613,132 | 3/1997 | Clift et al. | 395/393 |
| 5,627,985 | 5/1997 | Fetterman et al. | 395/393 |
| 5,721,855 | 2/1998 | Hinton et al. | 395/394 |
| 5,922,066 | 7/1999 | Cho et al. | 712/204 |

OTHER PUBLICATIONS

21164 Alpha™ Microprocessor Data Sheet—Samsung Electronics, 1997 Killian, Earl, MIPS Extensions for Digital Media, Silicon Graphics, no date shown.

MIPS Digital Media Extension, pp. C–1 to C40 MIPS Extension for Digital Media with 3D, MIPS Technologies, Inc., Mar. 12, 1997, pp. 1–26.

The VIS™ Instructions Set, Sun Microsystems, Inc, 1997, 2 pages. Visual Instruction Set (VIS™) User's Guide, Version 1.1, Sun Microsystems, Inc., Mar. 1997, Ch. 2.

The UltraSPARC Processor—Technology White Paper, Sun Microsystems, Inc., 1995. AMD–3D™ Technology Manual, Advanced Micro Devices, Feb. 1998.

Hansen, Craig, Architecuture of a Broadband Mediaprocessor, MicroUnity Systems Engineering, Inc., 1996, pp. 334–354.

Levinthal, Adam, et al; Parallel Computers for Graphics Applications; Pixar, San Rafael, CA, 1987, pp. 193–197.

Levinthal, Adam; Porter, Thomas. Chap—A SIMD Graphics Processor, Computer Graphics Project, Lucasfilm Ltd., 1984, pp. 77–81.

Wang, Mangaser, Srinivasan, A Processor Architecture for 3D Graphics Calculations, Computer Motion, Inc., no date shown, pp. 1–23.

*Primary Examiner*—David Y. Eng
*Attorney, Agent, or Firm*—Blakely, Sokoloff, Taylor & Zafman LLP

[57] ABSTRACT

A method and apparatus for updating the architectural state in a system implementing staggered execution with multiple micro-instructions. According to one aspect of the invention, a method is provided in which a macro-instruction is decoded into a first and second micro-instructions. The macro-instruction designates an operation on a pieced of data, and execution of the first and second micro-instructions separately cause the operation to be performed on different parts of the piece of data. The method also requires that the first micro-instruction is executed irrespective of the second micro-instructions (e.g., at a different time), and that it is detected that said second micro-instruction will not cause any non-recoverable exceptions. The results of the first micro-instruction are then used to update the architectural state in an earlier clock cycle than said second micro-instruction.

28 Claims, 5 Drawing Sheets

METHOD AND APPARATUS FOR HANDLING IMPRECISE EXCEPTIONS

FIELD OF THE INVENTION

The present invention relates to the field of computer systems. Specifically, the present invention relates to a method and apparatus for updating the architectural state in a system implementing staggered execution with multiple micro-instructions.

DESCRIPTION OF RELATED ART

Single Instruction Multiple Data (SIMD) technology has enabled a significant improvement in multimedia application performance. SIMD technology provides for a single macro-instruction who execution causes a processor to perform the same operation on multiple data items in parallel. This technology is especially suited to systems that provide packed data formats. A packed data format is one in which the bits in a register are logically divided into a number of fixed-sized data elements, each of which represents a separate value. For example, a 64-bit register may be broken into four 16-bit elements, each of which represents a separate 16-bit value. SIMD instructions then separately manipulate each element in these packed data types in parallel. For example, a SIMD packed ADD instruction adds together corresponding data elements from a first packed data operand and a second packed data operand. More specifically, the addition of the packed data operand X (having data elements $X_0, X_1, X_2, X_3$) and packed data operand Y (having data elements $Y_0, Y_1, Y_2, Y_3$) results in a packed data operand Z (having data elements $Z_0, Z_1, Z_2, Z_3$; where $Z_i=X_i+Y_i$).

Figure 1:
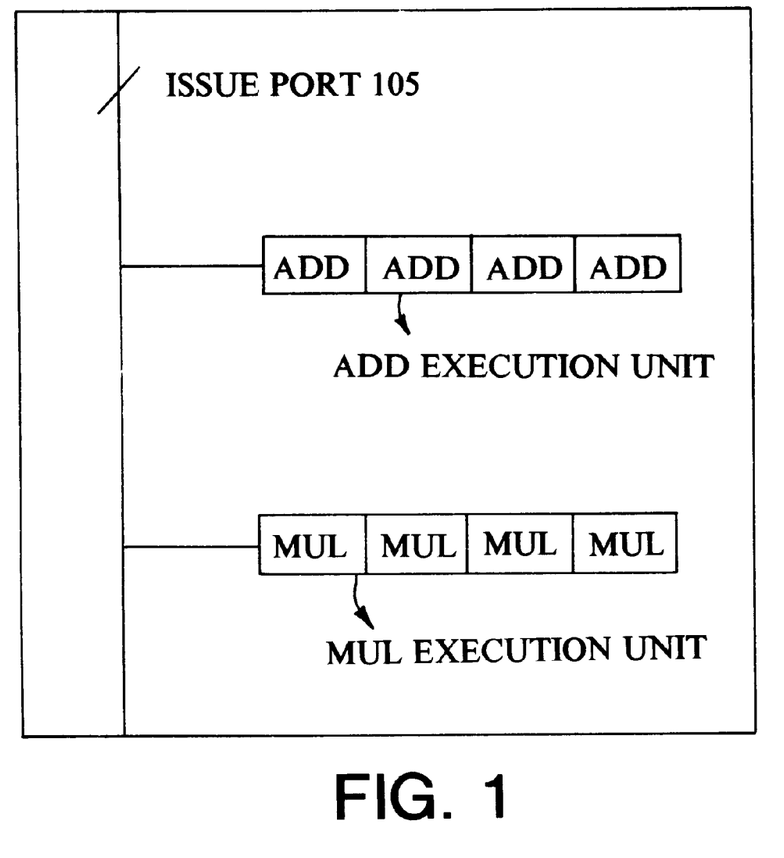
FIG. 1 illustrates a current processor implementation of an arithmetic logic unit (ALU) that can be used to execute SIMD instructions.

FIG. 1 illustrates a current processor implementation of an arithmetic logic unit (ALU) that can be used to execute SIMD instructions. The ALU of FIG. 1 includes the circuitry necessary to perform parallel operations on the full width of the operands (i.e. all of the data elements). In particular, FIG. 1 shows an ALU having an ADD execution unit and a MUL execution unit respectively capable of operating as four separate ADD execution units and four separate MUL execution units.

Many modern processors, whether in-order or out-of-order, must maintain a speculative state and an architectural state. The architectural state represents the in-order completion of instructions for which any and all exceptions have been handled. In contrast, the speculative state represents the in-order or out-of order execution of instructions for which exceptions may cause or have caused an exception. When a macro-instruction is passed from the speculative state to the architectural state, the macro-instruction is said to have updated the architectural state (e.g., in an in-order processor, when the macro-instruction has completed execution and the results have been written; in an out-of-order processor, when the macro-instruction has been "retired.") Since the operations of a macro-instruction in the system of FIG. 1 are performed on all of the data elements in parallel, the all of the results are used to update the architectural state together and after any exceptions have been resolved.

The implementation described above can require a significant amount of duplicated hardware components and can be inefficient in utilizing the hardware components (namely the ADD and MUL execution units).

SUMMARY OF THE INVENTION

A method and apparatus for updating the architectural state in a system implementing staggered execution with multiple micro-instructions is disclosed. According to one aspect of the invention, a method is provided in which a macro-instruction is decoded into a first and second micro-instructions. The macro-instruction designates an operation on a pieced of data, execution of the first and second micro-instructions separately cause the operation to be performed on different parts of the piece of data. The method also requires that the first micro-instruction is executed irrespective of the second micro-instructions (e.g., at a different time), and that it is detected that said second micro-instruction will not cause any non-recoverable exceptions. The results of the first micro-instruction are then used to update the architectural state in an earlier clock cycle than said second micro-instruction.

BRIEF DESCRIPTION OF THE DRAWINGS

The present invention is described by way of example and not by way of limitation with reference to the figures of the accompanying drawings in which like reference numerals refer to similar elements and in which.

DETAILED DESCRIPTION OF THE PREFERRED EMBODIMENT

A method and apparatus for updating the architectural state in a system implementing staggered execution with multiple micro-instructions is disclosed. In the following detailed description, numerous specific details are set forth in order to provide a thorough understanding of the present invention. It will be apparent to one of ordinary skill in the art that these specific details need not be used to practice the present invention. In other instances, well-known structures, interfaces, and processes have not been shown in detail in order not to unnecessarily obscure the present invention.

Figure 2:
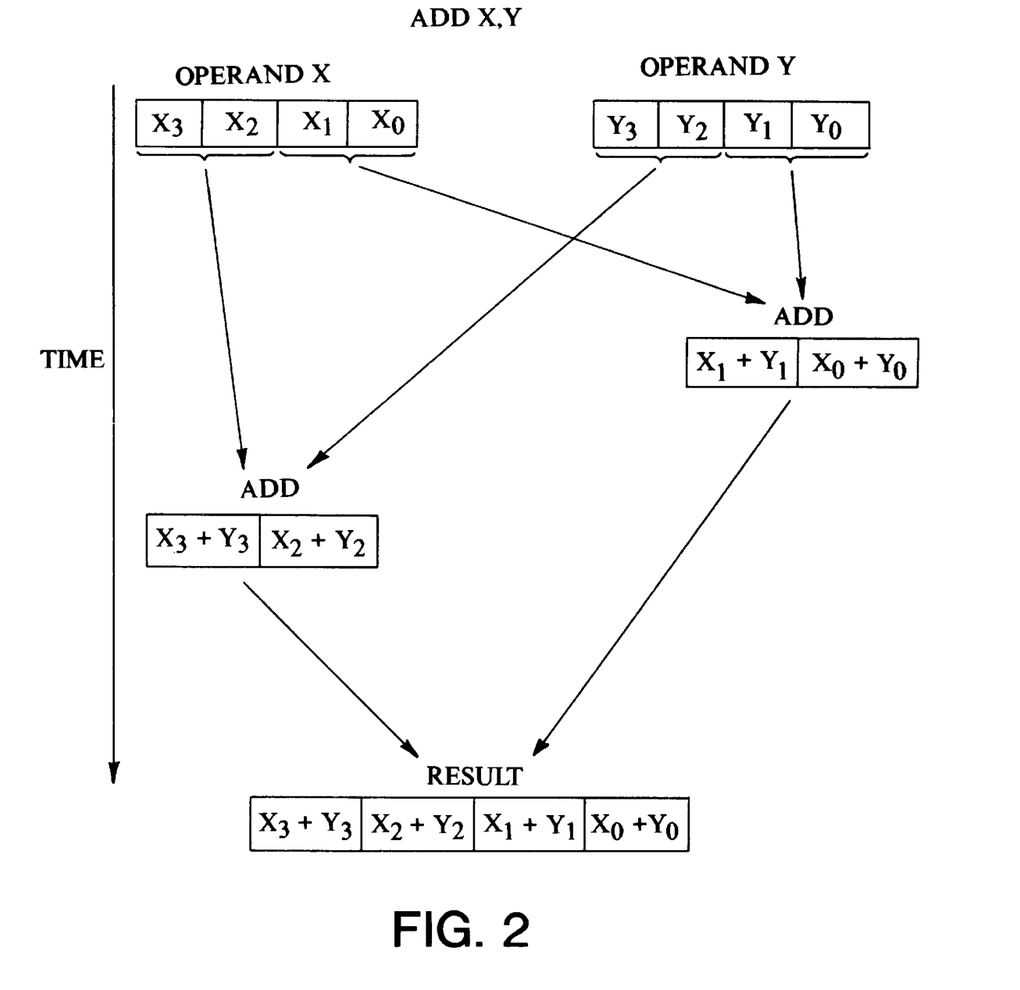
FIG. 2 illustrates conceptually the operation of specified by a packed data macro-instruction being performed on the operands in a "staggered" manner according to one embodiment of the invention.

FIG. 2 illustrates conceptually the operation of specified by a packed data macro-instruction being performed on the operands in a "staggered" manner according to one embodiment of the invention. Although one embodiment of the invention is described with reference to a packed data operand format, the following description is also applicable to performing certain operations (e.g. logical operations) on a scalar data format. "Staggered execution" in the context of this embodiment refers to the process of dividing a macroinstruction's operands into separate segments and independently processing each segment using the same hardware. The segments are independently processed by introducing a delay into the processing of the subsequent segments. As illustrated in FIG. 2, the packed data operands of an ADD instruction are divided into a "high order segment" (data elements 3 and 2) and a "low order segment" (data elements 1 and 0). The low order segment is processed while the high order segment is delayed. Subsequently, the high order segment is processed and the full-width result is obtained. Additionally, although the following embodiments are described as having ADD and MUL execution units, alternative embodiments can use different execution units (e.g., one alternative embodiment uses one or more Multiply Accumulate (MAC) units instead of the ADD and MUL execution units).

While there are a number of different ways in which the staggered execution of instructions can be achieved, the following describes embodiments that decode macro-instructions into two or more micro-instructions to implement staggered execution. In one exemplary embodiment that supports macro-instructions that specify logical registers containing 128-bit operands, each such macro-instruction is divided into at least two "staggered execution" micro-instructions that each operate on only half of the operand(s), the high and low order segments. In other words, each of the staggered execution micro-instructions respectively cause the operation specified by the macro-instruction to be performed at different times (and in some embodiments, using the same hardware) on the low and high order segments of the operands. In one embodiment, the following is performed: 1) the operands are divided into a high and low order segment when the staggered execution micro-instructions separately cause only half of the operands to be accessed from the logical registers; and 2) each micro-instruction causes half of the resulting operand to be written into the logical destination register specified by the macro-instruction. The staggered execution micro-instructions generated for a given macro-instruction are referred to as related staggered execution micro-instructions. Alternative embodiments may divide the operands in another manner (e.g., access and/or store the entire operand to the appropriate logical register at one time, but perform the operation specified by the macro-instruction one the half-width operands at different times). In addition, while one embodiment is described in which 128-bit operands are divided into two segments, alternative embodiments could use larger or smaller operands, and/or divide those operands into more than two segments.

The term logical register is used herein to refer to the concept of the manner in which instructions specify a storage area that contains a single operand. Thus, a logical register can be implemented in hardware using any number of well known techniques, including a dedicated physical register, one or more dynamically allocated physical registers using a register renaming mechanism (described in further detail below), etc.

Figures 3, 6:
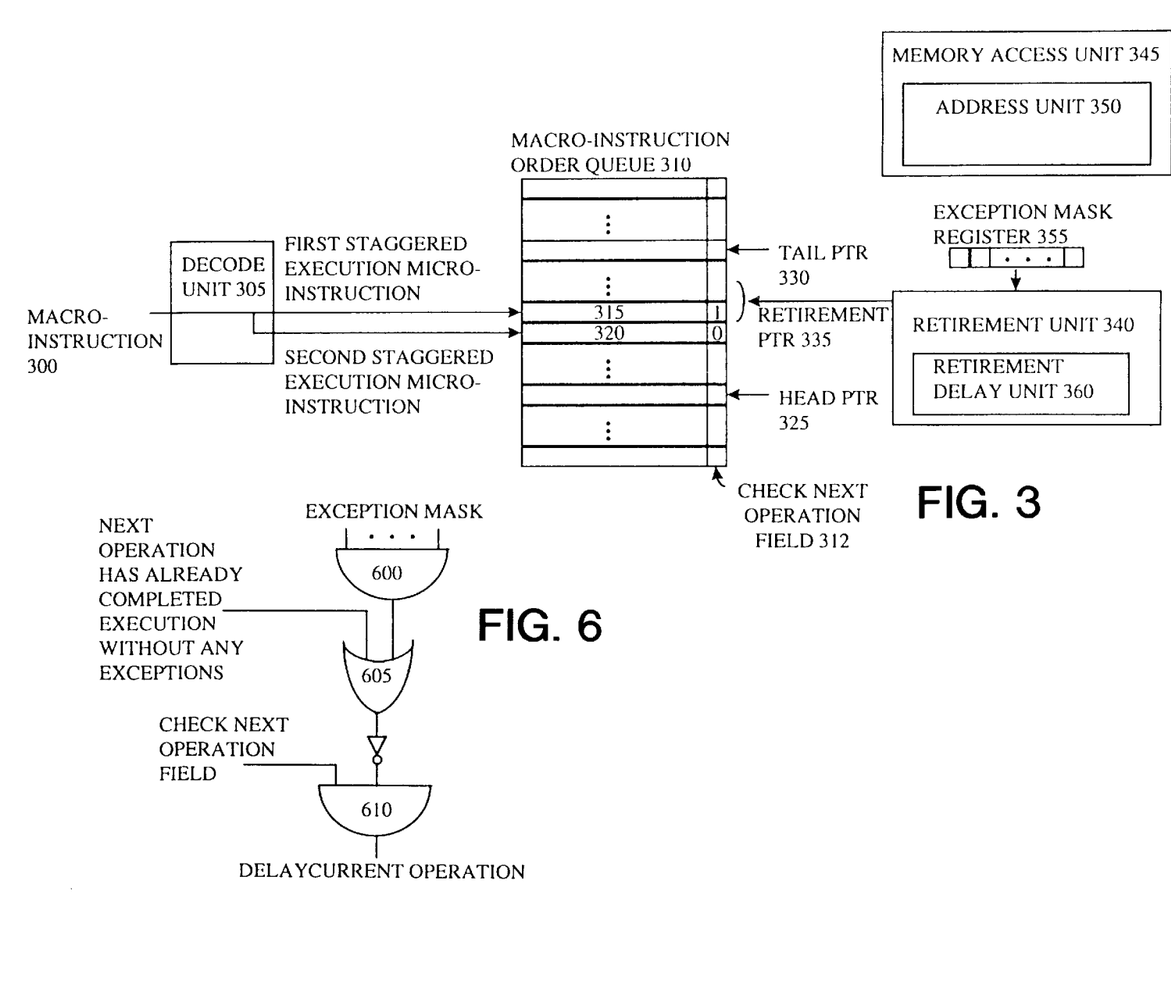
FIG. 3 is a conceptual block diagram illustrating additions to a processor architecture that allows for independent updating of the architectural state by related staggered execution micro-instructions and that provides a precise exception model according to one embodiment of the invention.
FIG. 6 is a conceptual circuit diagram of the retirement delay unit 360 according to one embodiment of the invention.

FIG. 3 is a conceptual block diagram illustrating additions to a processor architecture that allows for independent updating of the architectural state by related staggered execution micro-instructions and that provides a precise exception model according to one embodiment of the invention. While FIG. 3 conceptually shows various aspects of a processor, many well-known aspects of a processor are not illustrated because they are not necessary to understanding the invention. FIG. 3 shows a macro-instruction 300 entering a decode unit 305. Since the macro-instruction 300 is one of a type for which multiple micro-instruction staggered execution is used, the decode unit 305 generates two staggered execution micro-instructions in accordance with the exemplary embodiment shown in FIG. 3. That is, responsive to the macro-instruction 300 that specifies an operation to be performed on a full width operand, the decode unit 305 generates a first and second staggered execution micro-instructions that each cause that operation on a different half of the operand.

In processing the resulting staggered execution micro-instructions, the processor can perform register renaming and/or out of order execution. While the invention can be used with a number of different register renaming and out of order execution models, the invention will be described with reference to two different mechanisms respectively described in U.S. Pat. Nos. 5,446,912 and 5,197,132.

Regardless of whether register renaming and/or out of order execution are used, the processor receives macro-instructions in a given order and updates the architectural state in that order. As such, the order in which the macro-instructions were received must be maintained. Various techniques can be used for maintaining the order in which the macro-instructions are received. For example, in an in-order processor in which macro-instruction order is maintained by the pipeline(s), related staggered execution micro-instructions can be grouped by either allocating consecutive stages in the same pipeline or dispatching to multiple pipelines at the same time. In contrast, FIG. 3 illustrates an out-of-order processor. While various techniques can be used to maintain the order in which the macro-instructions were received, FIG. 3, for illustrative purposes, includes an instruction order queue 310. The instruction order queue 310 could be implemented using the reorder buffer of U.S. Pat. No. 5,446,912, the log of U.S. Pat. No. 5,197,132, or any other instruction order maintaining structure. The instruction order queue 310 is operated as a circular queue. As such, the instruction order queue 310 includes a head pointer 325 for identifying the next entry to be allocated, as well as a tail pointer 330 for indicating when the queue is full.

In the systems of U.S. Pat. Nos. 5,446,912 and 5,197,132, each macro-instruction is respectively allocated an entry in the reorder buffer or log in the order in which those macro-instructions are received. In this manner, a record of the order in which the macro-instructions were received is maintained. In contrast, the staggered execution of a macro-instruction requires that two entries in the instruction order queue 310 be allocated, one for each of the staggered execution micro-instructions. With reference to FIG. 3, the first and second staggered execution micro-instructions are respectively allocated entries 315 and 320 in the instruction order queue 310.

FIG. 3 also illustrates a retirement unit 340 that maintains a retirement pointer 335. The retirement pointer 335 follows the head pointer 325 and identifies the current set of entries in the instruction order queue 310 being considered for retirement (referred to as the "retirement window"). While different systems may attempt to retire different numbers of entries from the instruction order queue 310 at a time, one embodiment of the invention attempts to retire three entries at a time.

Whether using an in-order or out-of-order processor, certain issues are raised with respect to the updating the architectural state responsive to staggered execution micro-instructions. In particular, the architectural state must provide a precise exception model from the perspective of the programmer (this includes the operating system programmer). To ensure a precise exception model, a processor can be designed such that related staggered execution micro-instructions must update the architectural state together. Requiring all staggered execution micro-instructions to update the architectural state together ensures that the architectural state is updated only if both micro-instructions are executed without generating any "non-recoverable" exceptions. A non-recoverable exception is defined as an exception that cannot be handled by the processor. Thus, a non-recoverable exception does not include exceptions that can be handled by microcode and/or hardware, but includes exceptions that are visible to the programmer (including the operating system programmer).

Unfortunately, requiring staggered execution micro-instructions to update the architectural state together can reduce processor efficiency. In particular, there will be certain times when it is desirable to update the architectural state for the first micro-instruction at a different time than for the second micro-instruction. For example, assume the current retirement window includes the first micro-instruction but not the second micro-instruction. As another example, assume that the first micro-instruction completed execution, but the second micro-instruction has not.

One aspect of the invention is to allow related staggered execution micro-instructions to update the architectural state independently while still providing a precise exception model. To maintain a precise exception model, if the processor is attempting to update the architectural state responsive to a first staggered execution micro-instruction separately from a related second staggered execution micro-instruction, the processor must be able to ensure that the second staggered execution micro-instruction cannot cause a non-recoverable exception. Two categories of exceptions that are of concern include: 1) address exceptions; and 2) numerical exceptions.

Address Exceptions

With respect to address exceptions, in an embodiment in which a macro-instruction requiring a memory access (read or write) is decoded into two micro-instructions, each of the staggered execution micro-instructions performs the memory access for half of the width of the operand. To provide a precise exception model, it must be guaranteed that either of the staggered execution micro-instructions does not update the architectural state if either segment of the full width access will result in an address exception. Therefore, to provide the precise exception model, rather than checking only the half width address respectively associated with the first and second micro-instructions independently, the full width operand address is checked in association with at least the first staggered execution micro-instruction. Therefore, when the first staggered execution micro-instruction is ready to update the architectural state, it can be determined whether there was an address exception on either of the half width operand memory accesses. Whether any part or the full width operand address is checked as part of processing the second micro-instruction depends on the implementation. For example, in implementations in which the first micro-instruction is guaranteed to be executed before the second micro-instruction (e.g., an in-order implementation, an out-of-order implementation that is modified to require related staggered execution micro-instructions that perform memory accesses be executed in-order, etc.), operand address checking on the second staggered execution micro-instruction can be optional. As another example, in implementations in which related staggered execution micro-instruction that perform memory access can be executed out-of-order, either the half width operand or the full width operand address is checked as part of processing the second micro-instruction.

FIG. 3 shows a memory access unit 345. The memory access unit 345 includes an address unit 350 that, for a given staggered execution micro-instruction, checks the full width operand address as opposed to the half width operand address for which that given staggered execution micro-instruction is responsible. The memory access unit 345 is incorporated into a processor using well-known techniques that are not further described here.

Figure 4:
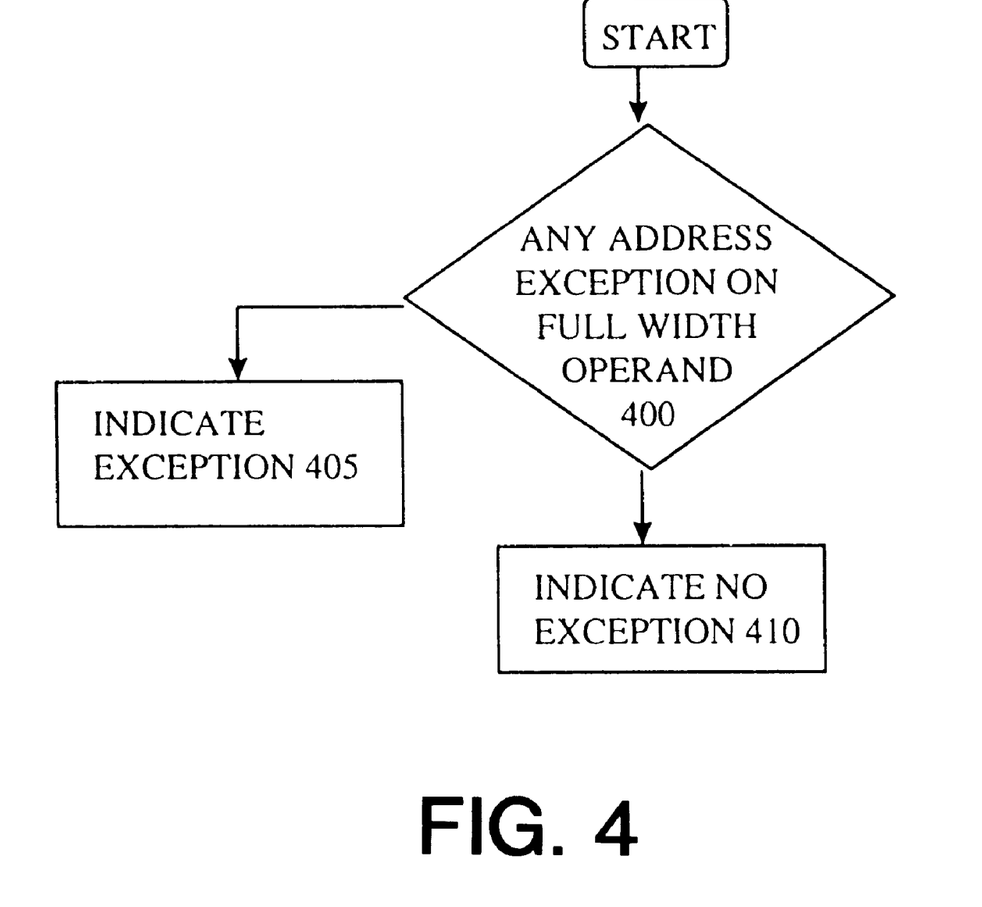
FIG. 4 is a flow diagram illustrating address exception checking for a single staggered execution micro-instruction according to one embodiment of the invention.

FIG. 4 is a flow diagram illustrating address exception checking for a single staggered execution micro-instruction according to one embodiment of the invention. In step 400, the full width operand address is checked even though the single staggered execution micro-instruction only operates on half of the width of the operand. In particular, an embodiment in which the operands are 128-bits, the address unit 350 performs a 128-bit wide check. In one embodiment, step 400 includes checking for alignment faults, page faults, and segment limit violation faults for many types of memory access operations. However, certain instructions (unaligned 128-bit loads, partial loads (loading only 16 or 64 bits of 128 bit operands), prefetches, etc.) supported by certain embodiments do not require an alignment check. In addition, the full width address checking is performed by associating the address of the lower order segment with both the first and second staggered execution micro-instructions. To obtain the address of the high order data segment, the fourth bit of the aligned address is set to one (equivalent to adding eight to the low order data segment address). Since the four least significant bits of an aligned address will be zero, in one embodiment the alignment is checked by testing the four least significant bits. As for segment limit violation and page faults, well-known techniques are used (e.g., the address from the low order segment is used as the base and the full width operand address is checked).

If any address exception is detected on the full width operation, flow passes to step 405 where the exception is recorded (e.g., in the appropriate entry of the instruction order queue 310). Otherwise, flow passes to step 410 in which the fact that no address exceptions were generated is recorded.

Numerical Exceptions

With respect to numerical exceptions, a numerical exception is typically not determined until the actual arithmetic operation is performed during an execution stage. However, the first and second staggered execution micro-instructions independently perform half of the arithmetic operation required by their parent macro-instruction. For each staggered execution micro-instruction, an indication as to whether any numerical exceptions were generated is stored in the appropriate entry of the instruction order queue 310. Therefore, one situation in which one staggered execution micro-instruction can update the architectural state independently is after the other staggered execution micro-instruction has completed execution without any exceptions. However, processor efficiency can be improved if a given staggered execution micro-instruction does not have to wait for the completion of execution of the other staggered execution micro-instruction. To this end, one embodiment of invention allows for the masking of numerical exceptions. When a numerical exception is masked, that exception is handled in a manner that is effectively invisible to the programmer (e.g., the exception is handled in microcode, with a special macro instruction routine designated for recoverable exceptions, etc.). In contrast, unmasked exceptions are those that are non-recoverable (they are exceptions that the machine itself cannot correct).

FIG. 3 illustrates an exception mask register 355 for storing data indicating which numerical exceptions are masked and which are unmasked according to well-known techniques. In an in-order processor, a similar technique can be used. While one embodiment is described in which the numerical exceptions can be selectively masked, alternative embodiments do not provide such a selection mechanism (e.g., certain or all numerical exceptions are always recoverable, certain or all numerical exceptions are always non-recoverable, etc.). In those situations where all numerical exceptions are recoverable, there is no need for a dependency between related staggered execution micro-instructions for purposes of numerical exception handling.

Architectural Update

Referring again to FIG. 3, the retirement unit includes a retirement delay unit 360. When a staggered execution micro-instruction is up for retirement, the retirement delay unit 360 determines whether updating the architectural state must be delayed on account of the related staggered execution micro-instruction. In the embodiment shown in FIG. 3, a staggered execution micro-instruction is detected by inspecting a check next operation field 312. In operation, data is stored in the check next operation field for an entry to link one entry to the next. In one embodiment that generates two staggered execution micro-instructions per macro-instruction, logic 1 and 0 are respectively stored in the check next operation fields of the entries allocated for the first a nd second staggered execution micro-instructions, respectively (see FIG. 3). Thus, a logic 1 in the check next operation field of an entry indicates that the next entry needs to be checked before the current entry is used to update the architectural state of the processor. While one embodiment uses a field in the instruction order queue, alternative embodiments could use any number of techniques (e.g., inspecting the opcodes in the instruction order queue, control bits associated with the first micro-instruction in an in-order processor, etc.).

Figure 5:
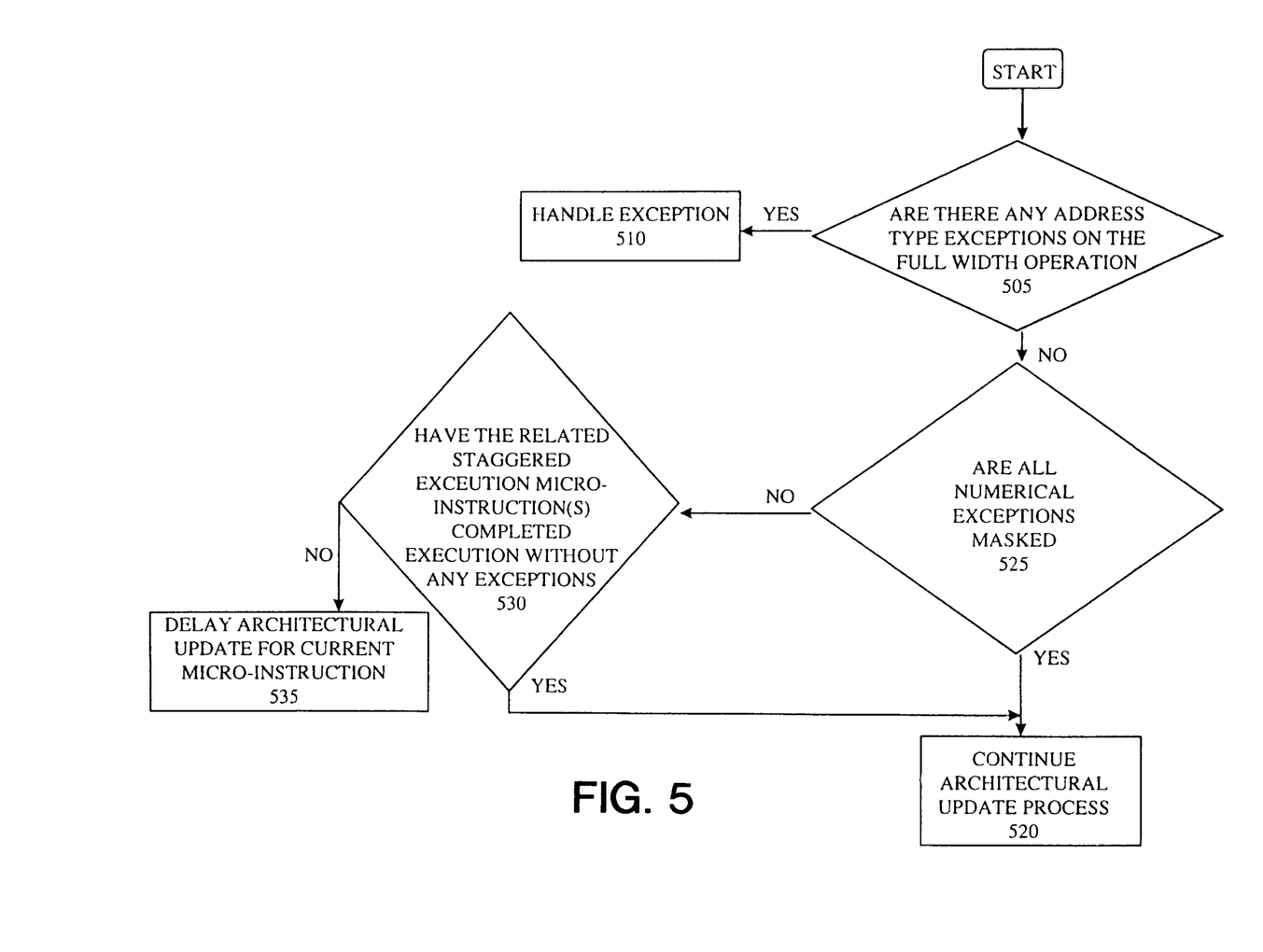
FIG. 5 is a flow diagram illustrating a method for independently updating the architectural state responsive to related staggered execution micro-instructions according to one embodiment of the invention.

FIG. 5 is a flow diagram illustrating a method for independently updating the architectural state responsive to related staggered execution micro-instructions according to one embodiment of the invention. In FIG. 5, it is assumed that a staggered execution micro-instruction is ready to update the architectural state. In step 505, it is determined if there are any address exceptions by inspecting previously recorded address exception data. With respect to FIG. 3, step 505 is performed by checking the exception data stored in the instruction order queue 310 by the address unit 350 (see steps 405 and 410 of FIG. 4). As previously described, the address unit 350 checks for address exceptions on the full width operation. If there are address exceptions, flow passes to step 510 and the exception is handled according to well-known techniques. Otherwise, control passes from step 505 to step 525.

As shown in step 525, it is determined if all numerical exceptions are masked. As previously described, when all numerical exceptions are masked, any numerical exceptions generated by a related staggered execution micro-instruction will be recoverable, and therefore, will not result in an imprecise exception state. If all numerical exceptions are masked, control passes from step 525 to step 520. In this manner, a staggered execution micro-instruction can be allowed to update the architectural state independently of the related staggered execution micro-instruction. By removing this restriction on the architectural updating process, processor efficiency is improved. In contrast, if at least one numerical exception is not masked, control passes to step 530. Of course, embodiments in which numerical exceptions cannot be selectively masked, step 525 is not required.

While one embodiment is described in which delaying the updating of the architectural state responsive to a current staggered execution micro-instruction is based on whether a related second staggered execution micro-instruction has completed execution without any exceptions or on whether all numerical exception are masked, alternative embodiments can provide greater granularity with respect to which numerical exceptions are masked. In particular, assuming execution of a micro-instruction generates a masked exception, it is not guaranteed that the exception is recoverable because the servicing of certain exceptions can result in the generation of other numerical exceptions (referred to as secondary numerical exceptions). If such a secondary numerical exception is generated that is currently unmasked, a non-recoverable exception will be generated. For at least certain exceptions there is a limited number of possible secondary numerical exceptions (in other words, the set of possible secondary numerical exceptions does not include all possible numerical exceptions). Thus, in one alternative embodiment, if a recoverable numerical exception (e.g., a masked numerical exception) is generated upon execution of staggered execution micro-instruction, updating the architectural state responsive to a related staggered execution micro-instruction is not delayed for purposes of numerical exceptions if all of the secondary numerical exceptions that can be generated during the servicing are recoverable (e.g., masked).

In step 530, it is determined if all the related staggered execution micro-instructions have completed execution without any exceptions. In particular, there will be times when the related staggered execution micro-instructions have already been executed, and therefore, any exceptions which may have been generated will already have been recorded (e.g., in the instruction order queue 310). If all of the related staggered execution micro-instructions have completed execution without any exceptions, control passes to step 520. In contrast, if any of the related staggered execution micro-instructions may or have caused a numerical exception, control passes to step 535 in which the updating of the architectural state is delayed. By way of example, control passes from step 530 to step 535 if: 1) a related staggered execution micro-instruction has caused a numerical exception; 2) a related staggered execution micro-instruction has not yet been executed; 3) information regarding a related staggered execution micro-is not available, etc. By way a further example, the information regarding a related staggered execution micro-instruction may not be available in an embodiment in which the last operation in the retirement window is not provided access to the next entry in the instruction order queue (no port to the retirement unit is provided from the next entry of the instruction order queue outside of the retirement widow).

In those cases in which updating the architectural state is delayed, the current micro-instruction will again be considered at the next architectural update opportunity. By way of example, in an in-order processor some sort of buffer area (e.g., buffer stage, temporary microcode register, etc.) is provided for the result of the first staggered execution micro-instruction until the second staggered execution micro-instruction is ready. While the described embodiment includes step 530, alternative embodiments that do not perform step 530 can simply have control pass from step 525 to step 535 when all numerical exceptions are not masked.

FIG. 6 is a conceptual circuit diagram of the retirement delay unit 360 according to one embodiment of the invention. The circuitry shown in FIG. 6 would provided in the retirement unit for each operation in the retirement widow, or one or more such circuits would be shared in a serial fashion by multiple operations in the retirement window. In FIG. 6, the exception mask bits are provided to the input of AND-gate 600. Assuming the exception mask bits are logic 1 when an exception is masked, the output of the AND-gate 600 will be logic 1 when all exceptions are masked -when independent retirement is not prevented due to numerical exceptions. The output of the AND-gate 600 is an input to an OR-gate 605. The other input to the OR-gate 605 is a signal indicating whether the other related micro-instruction (s) have already completed execution without any exceptions. This signal is generated by collecting and ANDing bit(s) indicating completion of execution and bit(s) indicating no exceptions with respect to the subsequent entries (e.g., the next entry) of the instruction order queue. As a result, the output of the OR-gate will be logic 1 when independent retirement is possible. The output of the OR-gate 605 is provided to an AND-gate 610 through an inverter. The other input of the AND-gate 610 is a signal indicating the status of the check next operation field for the current entry. In this embodiment, a logic 1 in the check next operation field indicates that the next entry of the instruction order queue 310 contains a related staggered execution micro-instruction. As such, all of the inputs to the AND-gate 610 are logic 1 when the retirement should be delayed.

While a conceptual circuit diagram has been illustrated in FIG. 6, any number of different circuit configurations can be implemented. For example, in the above described alternative embodiment in which the last operation in the retirement window is not provided access to the next entry in the instruction order queue, there is no signal available as to whether any related micro-instructions outside the retirement window have been executed without causing any exceptions.

Exemplary System

The dual micro-instruction implementation of staggered execution is particularly useful when incorporating operations of a larger operand size into existing processor architectures. For example, one embodiment incorporates 128-bit packed floating point operations into an existing 32-bit architecture (e.g., the Pentium® II processor). In this example, the processor supports Y new logical registers for storing packed floating point data. A packed floating point macro-instruction is converted into two half width (e.g. 64-bit) staggered execution micro-instructions, namely a "high order operation" and a "low order operation."

Assuming that the existing architecture performs register renaming using (in part) a register mapping table to map logical registers to physical registers, the logical source and/or destination registers of each staggered execution micro instruction are pointers to specific register entries in a new register mapping table (e.g. a RAT) added for the Y 128-bit logical registers. The entries in the register mapping table in turn point to the location of the physical register(s) currently allocated for the logical source and destination register(s). According to one embodiment, in order to accommodate the half width high and low order operations described above, the new RAT for packed floating point data is provided with Y*2 entries. Thus, for example, instead of a RAT with one entry for each of the Y new logical registers, the RAT has two entries for each of the Y new logical registers. Each entry is used for either the high or low half of one of the new 128-bit logical registers.

Each of the high and low order staggered execution micro-instructions thus has associated entries in the register mapping table corresponding to the respective operands. Each staggered execution micro-instruction retrieves and separately processes a 64-bit segment of the 128-bit operands. Thus, at different times, the same 64-bit hardware unit is used to execute the high and low order operations.

In one embodiment, a new 128-bit retirement register file is added for storing the architectural state of the Y new logical registers (e.g., similar to the retirement register files in U.S. Pat. No. 5,446,912). Alternative embodiments can handle the architectural state in different ways (e.g., having Y*2 64-bit retirement registers, each designated as high or low; not using a retirement register file—see U.S. Pat. No. 5,197,132; etc.).

In one embodiment, when a recoverable numerical exception is generated by a second staggered execution micro-instruction, the processor flushes the system before servicing the exception. Assuming that the first staggered execution micro-instruction has already executed and is ready for retirement, different embodiments handle the previously generated result of the first staggered execution micro-instruction different way. For example, in one embodiment the result of the first staggered execution micro-instruction is flushed and the first staggered execution micro-instruction is re-executed with the second staggered execution micro-instruction. In alternative embodiments, the result of the first staggered execution micro-instruction is preserved so that the first staggered execution micro instruction need not be re-executed. Any number of different mechanisms can be used for preserving the result of the first staggered execution micro-instruction (e.g., an additional temporary storage area to store the result, a mechanism to maintain the result in its current storage location during the flush, etc.)

Conclusion

Thus, a method and apparatus for independent retirement of staggered execution micro-instructions is disclosed. The specific arrangements and methods described herein are merely illustrative of the principles of the invention, and numerous modifications may be made without departing from the scope of the invention. Although this invention has been shown in relation to particular embodiments, it should not be considered so limited. Rather, the invention is limited only by the scope of the appended claims.

What is claimed is:

1. A computer implemented method comprising:
   decoding a macro-instruction, designating an operation on a piece of data, into a first and second micro-instructions whose execution separately causes the operation to be performed on different parts of the piece of data;
   executing said first micro-instruction irrespective of execution of said second micro-instruction;
   detecting that said second micro-instruction will not cause any non-recoverable exceptions; and
   in response to said detecting, updating the architectural state corresponding to said first micro-instruction in an earlier clock cycle than the clock cycle in which the architectural state corresponding to said second micro-instruction is updated.

2. The method of claim 1 wherein said detecting the said second micro-instruction will not cause any non-recoverable exceptions includes:

detecting said operation is a memory access; and during execution of the first micro-instruction, detecting the memory accesses required by both the first and second micro-instruction will not cause an address exception.

3. The method of claim 2 further comprising:

during execution of the second micro-instruction, detecting the memory accesses required by both the first and second micro-instructions will not cause an address exception.

4. The method of claim 2 further comprising:

executing the second micro-instruction before executing the first micro-instruction.

5. The method of claim 2, wherein the detecting the memory accesses required by both the first and second micro-instructions will not cause an address exception includes:

checking for alignment, page and segment violation faults.

6. The method of claim 2, wherein the macro-instruction specifies a packed data operation, the piece of data is a packed data item including a plurality of data elements, and the first and second micro-instructions cause the packed data operation to be performed on different ones of the plurality of data elements.

7. The method of claim 1, wherein said detecting that said second micro-instruction will not cause any non-recoverable exceptions includes:

detecting that the operation is an arithmetic operation; and detecting that said second micro-instruction will not cause any non-recoverable numerical exceptions.

8. The method of claim 7 wherein said detecting that said second micro-instruction will not cause any non-recoverable numerical exceptions includes:

detecting that all numerical exceptions are masked.

9. The method of claim 7, wherein the macro-instruction specifies a packed data operation, the piece of data is a packed data item including a plurality of data elements, and the first and second micro-instructions cause the packed data operation to be performed on different ones of the plurality of data elements.

10. The method of claim 1 wherein said detecting that said second micro-instruction will not cause any non-recoverable exceptions includes:

if said operation is a memory access, then detecting, during execution of the first micro-instruction, that the memory access for the second micro-instruction will not cause an address exception; and if said operation is an arithmetic operation, then detecting that no numerical exceptions can occur on execution of said second micro-instruction that are non-recoverable exceptions.

11. The method of claim 1, wherein the macro-instruction specifies a packed data operation, the piece of data is a packed data item including a plurality of data elements, and the first and second micro-instructions cause the packed data operation to be performed on different ones of the plurality of data elements.

12. The method of claim 11, wherein each of the plurality of data elements represents a floating point value.

13. The method of claim 11, wherein each of the plurality of data elements represents a integer value.

14. A processor comprising:

a decode unit to decode a macro-instruction, which designates an operation on data, into a first and second micro-instructions that cause the operation to be separately performed on different parts of the data; and a queue, coupled to the decode unit, to track the order in which macro-instructions are received by the decode unit, the queue having a plurality of entries, each of the plurality of entries including a check next operation field, said queue to store in sequential entries said first and second micro-instructions and to store data in the check next operation fields of the sequential entries to indicate the sequential entries belong to the same macroinstruction.

15. The processor of claim 14, further comprising:

an execution unit, coupled to the queue, to execute the first and second micro-instructions at different times.

16. The processor of claim 15, further comprising:

an address unit to check, responsive to a single one of said first and second micro-instructions, whether a memory access to the entire data will cause an address exception.

17. The processor of claim 16, wherein the macro-instruction specifies a packed data operation, the data is a packed data item including a plurality of data elements, and the first and second micro-instructions cause the packed data operation to be performed on different ones of the plurality of data elements.

18. The processor of claim 17, wherein said address unit checks whether a memory access will cause a misalignment, page, or segmentation violation fault.

19. The processor of claim 14, further comprising:

a retirement unit coupled to said queue to determine if said sequential entries can be retired independently.

20. The processor of claim 19, wherein said retirement unit includes a retirement delay unit to detect whether the second micro-instruction will cause any non-recoverable exceptions.

21. The processor of claim 19, wherein said retirement unit includes a retirement delay unit coupled to said fields to determine if retirement of said first micro-instruction must be delayed until after execution of the second micro-instruction.

22. The processor of claim 14, further comprising:

an exception mask register to store data to indicate which numerical exceptions are currently designated as non-recoverable; and a retirement delay unit coupled to said exception mask register and to said check next operation fields to delay retirement of said first micro-instruction if said second micro-instruction is guaranteed not to cause any numerical non-recoverable exceptions.

23. The processor said claim 22, further comprising:

an address unit to check, responsive to said first micro-instruction and independently of said second micro-instruction, whether a memory access to the entire data will cause an address exception, each of said plurality of entries including an exception field, said address unit coupled to said exception fields to store in the entry allocated for the first micro-instruction data indicating the result of the check, said retirement delay unit coupled to said exception fields.

24. The processor of claim 23, wherein the macro-instruction specifies a packed data operation, the data is a packed data item including a plurality of data elements, and the first and second micro-instructions cause the packed data operation to be performed on different ones of the plurality of data elements.

25. A processor comprising:

means for decoding a macro-instruction, which designates an operation on data, into a first and second micro-instructions that cause the operation to be separately performed on different parts of the data;

means for executing said first micro-instruction irrespective of execution of said second micro-instruction;

means for detecting that said second micro-instruction will not cause any non-recoverable exceptions; and means for updating, in response to said detecting, the architectural state corresponding to said first micro-instruction in an earlier clock cycle than the clock cycle in which the architectural state corresponding to said second micro-instruction is updated.

26. The processor of claim 25, wherein said detecting means detects that said operation is a memory access, and during execution of the first micro-instruction, detects the memory accesses required by both the first and second micro-instruction will not cause an address exception.

27. The processor of claim 25, wherein said detecting means detects that said operation is an arithmetic operation, and detects that said second micro-instruction will not cause any non-recoverable numerical exceptions.

28. A processor comprising:

a decode unit to decode a macro-instruction, which designates an operation on data, into a first and second micro-instructions that cause the operation to be separately performed on different parts of the data;

a queue, coupled to the decode unit, having a plurality of entries to store data indicating that said first and said second micro-instructions belong to the same macro-instruction;

an address unit to check, responsive to one of said micro-instructions independent of the other of said micro-instructions, whether a memory access to the entire data will cause an address exception;

wherein the macro-instruction specifies a packed data operation, the data is a packed data item including a plurality of data elements, and the first and second micro-instructions cause the packed data operation to be performed on different ones of the pluralityof data elements;

an execution unit, coupled to the queue, to execute the first and second micro-instructions at different times; and a retirement unit coupled to said queue to determine if said first and second micro-instructions can be retired independently.

* * * * *

UNITED STATES PATENT AND TRADEMARK OFFICE
CERTIFICATE OF CORRECTION

PATENT NO.     : 6,085,312                                    Page 1 of 1
DATED          : July 4, 2000
INVENTOR(S)    : Abhammad Abdallah et al.

It is certified that error appears in the above-identified patent and that said Letters Patent is hereby corrected as shown below:

Column 12,
Line 14, delete "macroinstruction" and insert -- macro-instruction --.
Line 24, delete "spccifics" and insert -- specifies --.

Column 14,
Line 19, delete "pluralityof" and insert -- plurality of --.

Signed and Sealed this

Twenty-sixth Day of March, 2002

Attest:

*Attesting Officer*

JAMES E. ROGAN
*Director of the United States Patent and Trademark Office*